United States Patent
Savransky et al.

(10) Patent No.: US 7,757,103 B2
(45) Date of Patent: Jul. 13, 2010

(54) METHOD AND APPARATUS TO ESTIMATE ENERGY CONSUMED BY CENTRAL PROCESSING UNIT CORE

(75) Inventors: Guillermo Savransky, Haifa (IL); Efraim Rotem, Haifa (IL); Ittai Anati, Haifa (IL); Oren Lamdan, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 747 days.

(21) Appl. No.: 11/641,952

(22) Filed: Dec. 20, 2006

(65) Prior Publication Data

US 2008/0155281 A1 Jun. 26, 2008

(51) Int. Cl.
*G06F 1/00* (2006.01)
*G06F 1/32* (2006.01)
*G06F 17/50* (2006.01)

(52) U.S. Cl. .................. 713/300; 713/320; 716/2

(58) Field of Classification Search .................. 713/300
See application file for complete search history.

(56) References Cited

U.S. PATENT DOCUMENTS

| | | | |
|---|---|---|---|
| 6,564,328 B1 * | 5/2003 | Grochowski et al. | 713/320 |
| 6,622,287 B1 * | 9/2003 | Henkel | 716/2 |
| 7,093,147 B2 * | 8/2006 | Farkas et al. | 713/320 |
| 7,249,331 B2 * | 7/2007 | Bose et al. | 716/4 |
| 7,549,069 B2 * | 6/2009 | Ishihara et al. | 713/320 |
| 2006/0090086 A1 | 4/2006 | Rotem et al. | |

OTHER PUBLICATIONS

Sami et al, Instruction-Level Power Estimation for Embedded VLIW Cores, 2000, ACM San Diego CA, 1 58114-268-9/00/5.*

* cited by examiner

*Primary Examiner*—Suresh K Suryawanshi
(74) *Attorney, Agent, or Firm*—Pearl Cohen Zedek Latzer, LLP

(57) ABSTRACT

Briefly, a processor and a method of estimating an active energy consumption of two or more cores of a processor based on dispatching micro operations to one or more execution units of the processor.

25 Claims, 3 Drawing Sheets

METHOD AND APPARATUS TO ESTIMATE ENERGY CONSUMED BY CENTRAL PROCESSING UNIT CORE

BACKGROUND OF THE INVENTION

Central Processing Units (CPU) in various environments are facing constantly increasing power constraints. In many cases power is becoming the major performance limiter. For example, reducing CPU performance in order to remain within the cooling limits. Some exemplary usage models that rely on the ability to monitor the CPU's energy/power consumption in order to improve the CPU's/system's performance in a thermally limited environment are listed hereinafter:

1. Power aware scheduling usage module that identifies "hot threads" in CPUs/Cores and balances the thermal load between CPUs/Cores in multi CPU/core environment;
2. A usage module that optimizes the performance of high power applications in a thermally constrained environment by "smoothing" their power profile; and
3. A usage module that uses power driven thermal controls of the CPU (replacing the non-deterministic temperature driven controls) for CPU and/or platform management.

Other usage modules and/or methods may employ power measurement by adding system components that are dedicated for this purpose. These methods may add to the CPU system complexity and to the overall costs of the CPU semiconductors devices. Furthermore, these methods do not provide the required functionality of cost effective energy/power control of the CPU cores.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
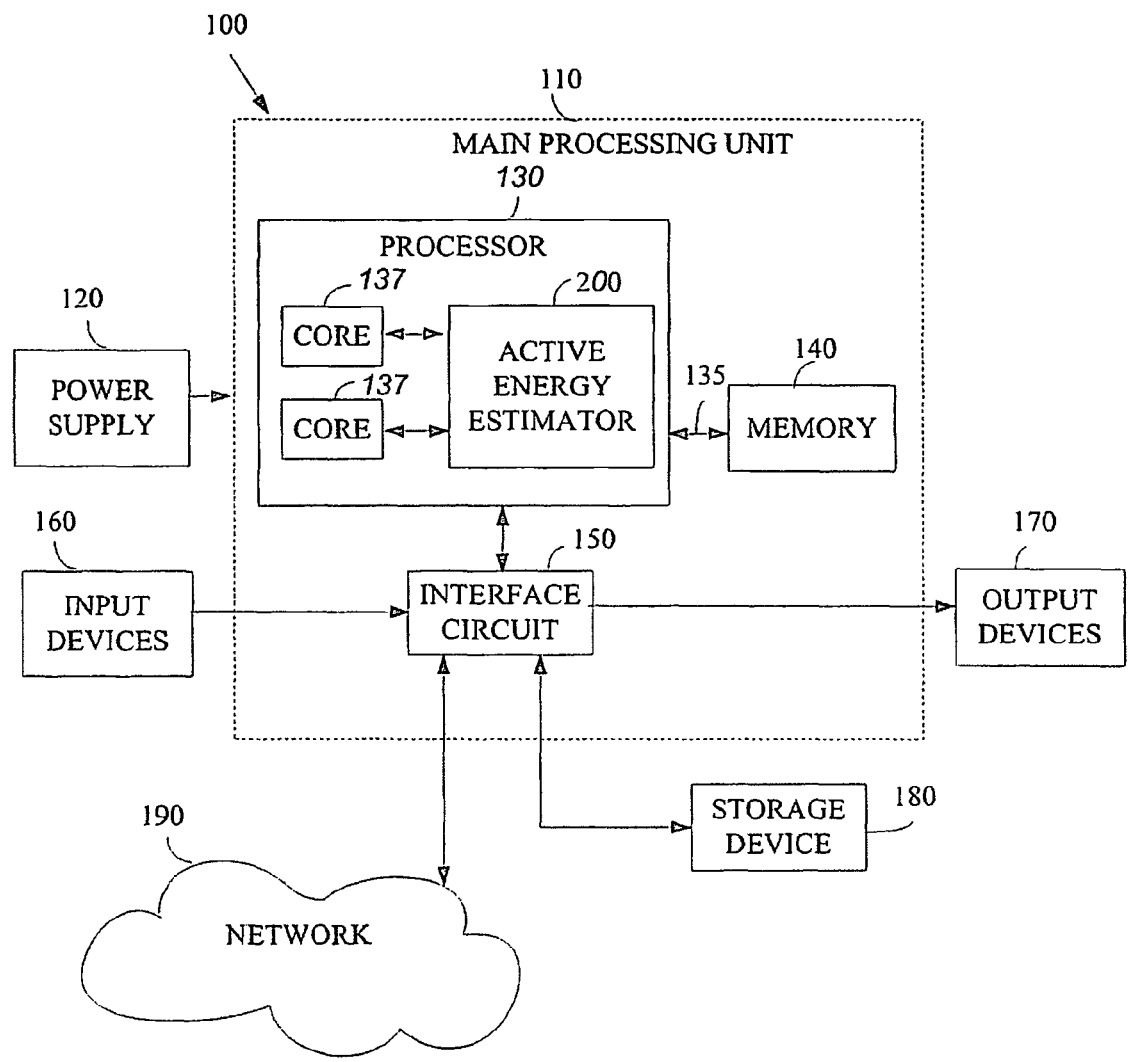
FIG. 1 is a schematic illustration of a block diagram of computer system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like. For example, "plurality of instructions" describes two or more instructions.

It should be understood that the present invention may be used in a variety of applications. Although the present invention is not limited in this respect, the circuits and techniques disclosed herein may be used in many apparatuses such as computer systems, processors, CPU or the like. Processors intended to be included within the scope of the present invention include, by way of example only, a reduced instruction set computer (RISC), a processor that have a pipeline, a complex instruction set computer (CISC), a multi core processor, a computer platform and the like.

Some embodiments of the invention may be implemented, for example, using a machine-readable medium or article which may store an instruction or a set of instructions that, if executed by a machine (for example, by a processor and/or by other suitable machines), cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Turning to FIG. 1, a block diagram of a computer system 100 according to an exemplary embodiment of the invention is shown. Although the scope of the present invention is not limited in this respect, computer system 100 may be a personal computer (PC), a personal digital assistant (PDA), an Internet appliance, a cellular telephone, a laptop computer, a mobile unit, a wireless communication device and/or any other computing device.

According to one exemplary embodiment of the present invention, computer system 100 may include a main processing unit 110 powered by a power supply 120. Main processing unit 110 may include a processor 130 electrically coupled by a system interconnect 135 to a memory device 140 and one or more interface circuit(s) 150. For example, the system interconnect 135 may be an address/data bus, if desired. It should be understood that interconnects other than busses may be used to connect processor 130 to memory device 140. For example, one or more dedicated lines and/or a crossbar may be used to connect processor 130 to memory device 140.

According to some embodiments of the invention, processor 130 may include any type of central processing unit (CPU). For example, processor 130 may include one or more cores 137 and an active energy estimator 200. In addition, processor 130 may include a cache memory (not shown), such as, for example, static random access memory (SRAM) and the like, or any other type of internal integrated memory. Memory device 140 may include a dynamic random access memory (DRAM), a non-volatile memory, or the like. In one example, memory device 140 may store a software program which may be executed by processor 130, if desired.

Although the scope of the present invention is not limited in this respect, interface circuit(s) 150 may include an Ethernet interface and/or a Universal Serial Bus (USB) interface, and/or the like. In some exemplary embodiments of the invention, one or more input device(s) 160 may be connected to interface circuit(s) 150 for entering data and commands into the main processing unit 110. For example, input device(s) 160 may include a keyboard, mouse, touch screen, track pad, track ball, isopoint, a voice recognition system, and/or the like.

Although the scope of the present invention is not limited in this respect, the output device(s) 170 may be operably coupled to main processing unit 110 via one or more of the interface circuit(s) 150 and may include one or more displays, printers, speakers, and/or other output devices, if desired. For example, one of the output devices may be a display. The display may be a cathode ray tube (CRT), a liquid crystal display (LCD), a plasma display or any other suitable type of display.

Although the scope of the present invention is not limited in this respect, computer system 100 may include one or more storage devices 180. For example, computer system 100 may include one or more hard drives, one or more compact disk (CD) drive, one or more digital versatile disk drives (DVD), and/or other computer media input/output (I/O) devices, if desired.

Although the scope of the present invention is not limited in this respect, computer system 100 may exchange data with other devices via a connection to a network 190. The network connection may include any type of network connection, such as an Ethernet connection, a digital subscriber line (DSL), a telephone line, a coaxial cable, etc. Network 190 may be any type of network, such as the Internet, a telephone network, a cable network, a wireless network such as, for example, a network complying IEEE standard 802.11a/b/g, 1999, IEEE 802.16 Standard for Wireless Metropolitan Area Networks (e.g., WiMAX), a cellular telephone modem and/or the like.

Although the scope of the present invention is not limited to this exemplary embodiment of the invention, active energy estimator 200 may estimate an energy consumption of cores 137 based on an activity rate of dispatching micro operations to one or more execution units of processor 130. Active energy estimator 200 may provide active energy consumption estimation to a software application and/or hardware for controlling an energy consumption of processor 130, if desired. Active energy estimator 130 may monitor dispatching one or more micro operations from one or more dispatching ports, decode an attribute of a dispatched micro operation, translate the attribute to an energy coefficient based on the attribute, and may sum energy coefficients of the one or more micro operation to provide an energy estimation, if desired. It should be understood that active energy estimator 200 may be implemented by hardware, by software, and/or by any combination of hardware and/or software.

Furthermore, processor 130 may provide an output signal corresponding to the energy consumption estimation through output device(s) 170 and/or through network 190. One or more computers which may be operably coupled to output device(s) 170 may read the energy estimation, if desired. The one or more computers may execute a power consumption application that may send instructions to balance the power of processor 130, if desired. In some embodiments of the invention, processor 130 may receive from the one or more computers instructions to balance the power of processor 130 based on the energy estimation, although the scope of the present invention is not limited in this respect.

Although the scope of the present invention is not limited in this respect, in some embodiments a micro-architecture event may be characterized by micro-architecture instructions such as, for example, LOAD, STORE, ADD, SUBTRACT, MULT, SHIFT, AND, etc. In addition, the instructions may include input values and output values such as, for example, register values and/or constants.

Figure 2:
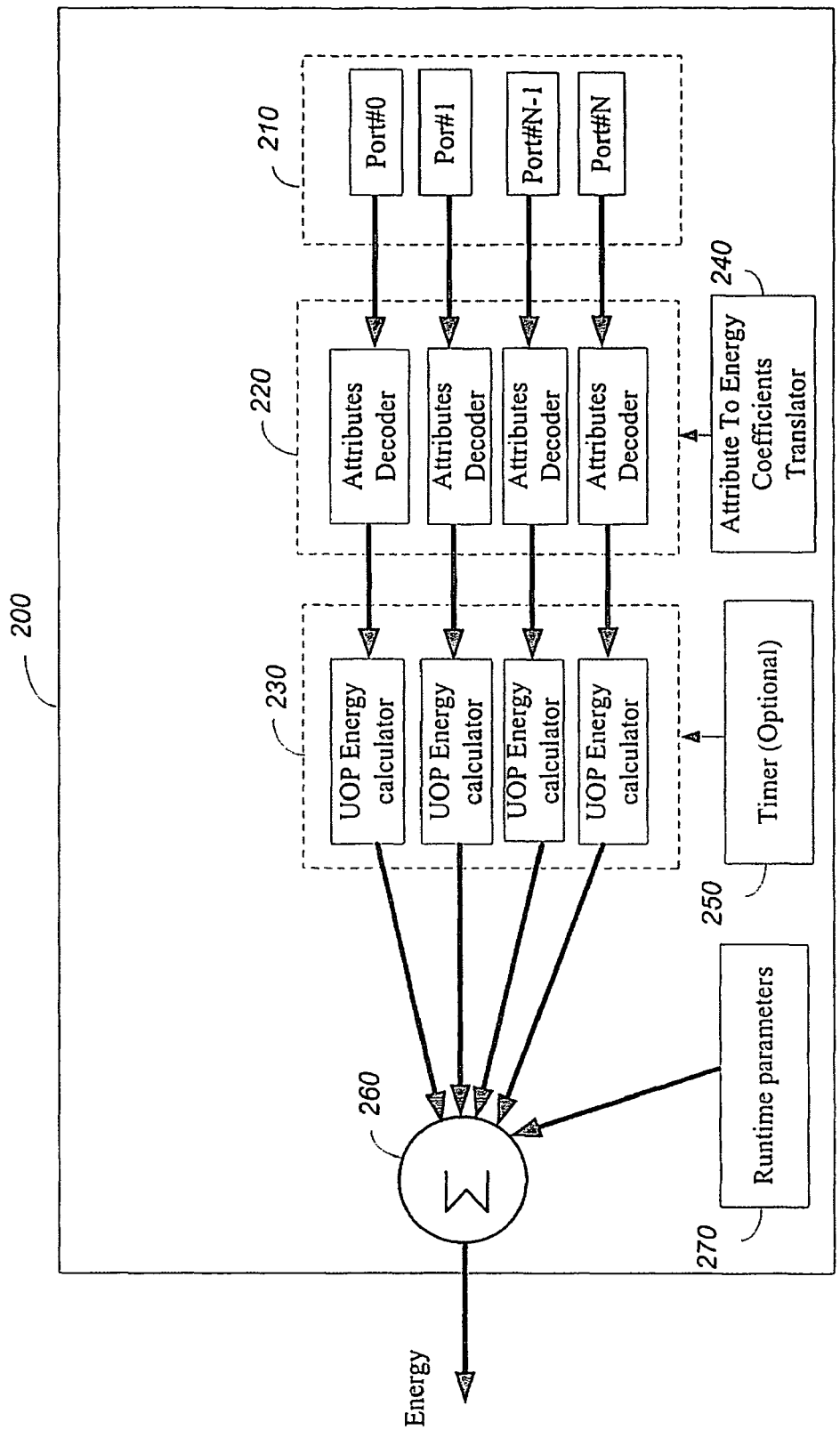
FIG. 2 is a schematic illustration of a detailed block diagram of an active energy estimator of FIG. 1, according to an exemplary embodiment of the invention.

Turning to FIG. 2, a more detailed block diagram of active energy estimator 200 of FIG. 1 according to an exemplary embodiment of the invention is shown. Although the scope of the present invention is not limited in this respect, active energy estimator 200 may include a micro operation dispatcher 210, an attribute decoder 220, an energy calculator 230, an attribute to energy coefficient translator 240, a timer 250, a summation unit 260 and a runtime parameter unit 270.

According to some embodiments of the invention, a core (e.g., core 137) may include one or more ports for example, port#0, port#1, port#N-1 and port#N. Dispatcher 210 may dispatch micro operations which include attributes from port#0, port#1, port#N-1 and port#N, if desired. According to exemplary embodiments of the invention, an attribute may include a corresponding target execution unit, for example: Adder, Divider etc., size of data handled, for example: 32 bits, 64 bits, 128 bits etc. and/or an anticipated processing length (in cycles), although it should be understood the attribute is in no way limited to these examples. The data of the attribute is correlated to a consumed energy of that the micro operation while being executed. Thus, the data of the attribute may be used to estimate energy consumption of the micro operation while being executed.

According to exemplary embodiment of the invention dispatcher 210 dispatches the micro operations to attribute decoder 220. Attribute decoder 220 decodes the dispatched attributed and translate the decoded attribute to an energy coefficient. For example, attribute to energy coefficient translator 240 may provide an energy coefficient that may match the decoded attribute to a frequency coefficient. According to one exemplary embodiment of the invention attribute to energy coefficient translator 240 may include a look up table (LUT) that may be looked up for energy coefficient according to the decoded attribute data.

Although the scope of the present invention is not limited in this respect, energy calculator 230 may calculated the estimated energy of each port (e.g., port#0, port#1, port#N-1 and port#N). Summation unit 260 may sum the estimated energy of all the micro operations over a given time frame. According to one exemplary embodiment timer 250 may control energy calculation unit 230 and summation unit 260 operations by allocating a desired time frame for energy calculation. Runtime parameter unit 270 may provide runtime parameters to summation unit 260, if desired.

It should be understood that attribute decoder 220 may be duplicate on every port that dispatches micro operations for execution on every core of the processor system while energy calculator 230 and summation unit 260 may be implemented in a common block that sums up all the processor system energy, if desired. It should be understood that the components of active energy estimator 200 may be implemented by hardware and/or by software and/or by any combination of hardware and software.

It is understood that the present inversion may be related to either power or energy. A coordinated operation of summation unit 260 with timer 250 may provides low pass filtering effect that smoothes instantaneous power readings and enables stable control mechanisms. For example, summation unit 260 in combination with timer 250 may calculate average power over a desired period of time. Longer timer period provides more filtering to the power reading and vice versa. Runtime parameters unit 270 may provide additional parameter which may be needed for total energy or power calculation to summation unit 260. For example, The runtime parameters may include physical conditions such as voltage and frequency or other energy sources such as leakage.

Figure 3:
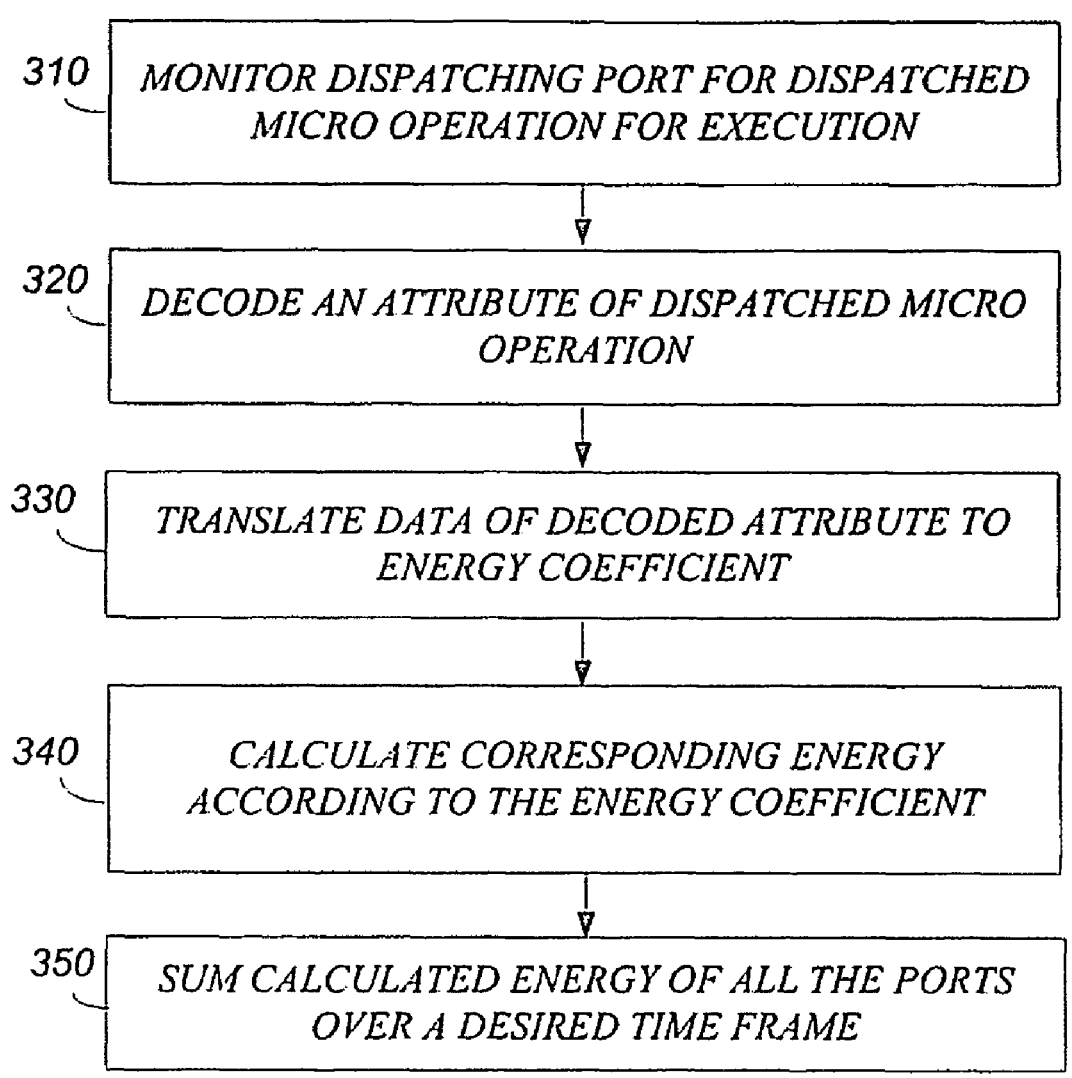
FIG. 3 is an illustration of flowchart of a method of estimating active energy of micro operations according to exemplary embodiments of the invention.

Turning to FIG. 3, an illustration of flowchart of a method of estimating active energy of micro operations according to exemplary embodiments of the invention is shown. Although the scope of the present invention is not limited in this respect, the method may be implemented on each dispatching port of each core if desired. According to some embodiments of the invention, the method starts with monitoring dispatching port for dispatched micro operation for execution (text block 310).

According to embodiments of the invention, the dispatched micro operation may include attribute. The attribute may include the following data a target execution unit and/or processed data size and/or processing length and the like. The attribute of the dispatched micro operation is decoded (text block 320) and the decoded data may be translated to an energy coefficient (text block 330). A corresponding energy coefficient may be looked up in a look up table, if desired.

According to embodiments of the invention, the active energy estimation may be done by calculating the active energy based on the energy coefficient (text block 340) and summing the calculated energy of all the ports of the processor system over a desired time frame (text block 350).

According to embodiments of the invention, the method utilizes information that is used to maximize the CPU's performance and throughput for dynamically estimating a cores' active power. The method may utilize on-die components and provides a relatively accurate estimation that is otherwise obtained by adding expensive/complex external components. Software application may use the energy estimation to monitor the software's energy consumption history. Combined with energy aware scheduling heuristics, the software may pick the best candidate for scheduling.

According to other embodiments of the invention, energy aware scheduling heuristic may includes a thermally aware scheduler that may account for power and thermal constraints of the processor. The thermally aware scheduler may provide a desired amount of power at the same time to the one or more cores of the processor. It should be understood that the similar concept may apply to power or thermally associated CPUs that reside on separate packages on a board or different boards. For example, high performance workstations and/or servers or the like.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method comprising:
estimating an active energy consumption of one or more cores of a processor based on dispatching micro operations to one or more execution units of the processor;
monitoring dispatching one or more micro operations from one or more ports;
decoding an attribute of a dispatched micro operation and providing an energy coefficient based on the attribute; and
summing a calculated energy based on the energy coefficient of the one or more micro operations to provide an active energy consumption estimation.

2. The method of claim 1, wherein estimating comprises:
allocating a time period for calculating the active energy consumption; and
calculating the active energy consumption over the time period.

3. The method of claim 1, wherein estimating comprises:
calculating the active energy consumption based on one or more runtime parameters.

4. The method of claim 1, wherein estimating comprises:
providing an active energy consumption estimation to a software application for controlling an energy consumption of the processor.

5. The method of claim 1, wherein estimating comprises:
providing an active energy consumption estimation to one or more hardware component that control an energy consumption of the processor.

6. The method of claim 1, comprising:
controlling an energy consumption of a processor system which includes two or more cores according to the active energy power consumption estimation.

7. The method of claim 1, comprising:
controlling energy consumption of the one or more cores based on the energy estimation.

8. A processor comprising:
an active energy estimator to estimate an active energy consumption of one or more cores of a processor based on an activity rate of dispatching micro operations to one or more execution units of the processor wherein the active energy estimator comprises:
a dispatcher to dispatch one or more micro operations from one or more dispatching ports;
an attribute decoder to decode an attribute of a dispatched micro operation and to provide an energy coefficient based on the attribute; and
a summation unit to sum calculated energy of the one or more micro operations over a desired time frame to provide the active energy consumption estimation.

9. The processor of claim 8, wherein the active energy estimator is able to provide active energy consumption estimation to a software application for controlling an energy consumption of the processor.

10. The processor of claim 8, wherein the active energy estimator is able to provide active energy consumption estimation to one or more hardware component that control an energy consumption of the processor.

11. The processor of claim 8, wherein the active energy estimator comprises:
an energy calculator to calculate an energy of the one or more micro operations based on the energy coefficient.

12. The processor of claim 8, wherein the active energy estimator comprises:
an attribute to energy coefficient translator to translate the dispatched micro operation to the energy coefficient.

13. The processor of claim 8, wherein the active energy estimator comprises:
a runtime parameters unit to provide one or more runtime parameters to the summation unit and wherein the active energy estimator calculates an energy consumption of the one or more cores of the processor based on the runtime parameters.

14. A computing platform comprising:
a memory to store a software application for controlling an energy consumption of a processor, wherein the processor includes one or more cores and an active energy estimator to estimate an active energy consumption of the one or more cores of the processor based on an activity rate of dispatching micro operations to one or more execution units of the processor and the active energy estimator comprises:
a dispatcher to dispatch one or more micro operations from one or more ports;
an attribute decoder to decode an attribute of a dispatched micro operation and to provide an energy coefficient based on the attribute; and
a summation unit to sum calculated energy of the one or more micro operations over a desired time frame to provide the active energy consumption estimation.

15. The computing platform of claim 14, wherein the active energy estimator is able to provide active energy consumption estimation to a software application for controlling an energy consumption of the processor.

16. The computing platform of claim 14, wherein the active energy estimator is able to provide active energy consumption estimation to one or more hardware component that control an energy consumption of the processor.

17. The computing platform of claim 14, wherein the active energy estimator comprises:
an energy calculator to calculate an energy of the one or more micro operations based on the energy coefficient.

18. The computing platform of claim 14, wherein the active energy estimator comprises:
an attribute to energy coefficient translator to translate the dispatched micro operation to the energy coefficient.

19. The computing platform of claim 14, wherein the active energy estimator comprises:
a runtime parameters unit to provide one or more runtime parameters to the summation unit and wherein the active energy estimator calculates an energy consumption of the one or more cores of the processor based on the runtime parameters.

20. An article comprising: a computing platform and a memory, having stored thereon instructions, that when executed by the computing platform, result in:
estimating an active energy consumption of one or more cores of a processor based on dispatching micro operations to one or more execution units of the processor;
monitoring dispatching one or more micro operations from one or more ports;
decoding an attribute of a dispatched micro operation and providing an energy coefficient based on the attribute; and
summing a calculated energy based on the energy coefficients of the one or more micro operations to provide the active energy consumption estimation.

21. The article of claim 20, wherein the instructions of estimating when executed result in:
allocating a time period for calculating the active energy consumption; and
calculating the active energy consumption over the time period.

22. The article of claim 20, wherein the instructions of estimating when executed result in:
calculating the active energy consumption based on one or more runtime parameters.

23. The article of claim 20, wherein the instructions of estimating when executed result in:
providing an active energy consumption estimation to a software application for controlling an energy consumption of the processor.

24. The article of claim 20, wherein the instructions of estimating when executed result in:
providing an active energy consumption estimation to one or more hardware component that control an energy consumption of the processor.

25. The article of claim 20, wherein the instructions of estimating when executed result in:
controlling an energy consumption of a processor system which includes two or more cores according to the active energy power consumption estimation.

* * * * *